Figure 1:
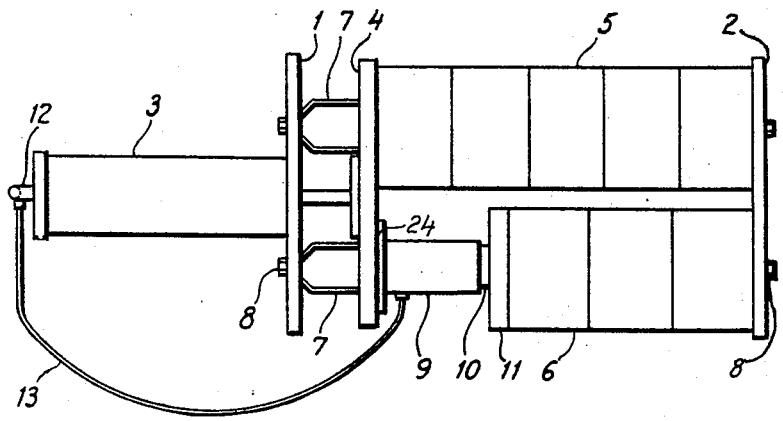

Jan. 28, 1964  C. B. SJÖHOLM  3,119,325
CHEESE PRESS

Filed Nov. 17, 1960  2 Sheets-Sheet 1

INVENTOR.
Claes Bertil Sjöholm
BY Davis, Hoxie, Faithfull & Hapgood
Attorneys

Jan. 28, 1964  C. B. SJÖHOLM  3,119,325
CHEESE PRESS
Filed Nov. 17, 1960  2 Sheets-Sheet 2
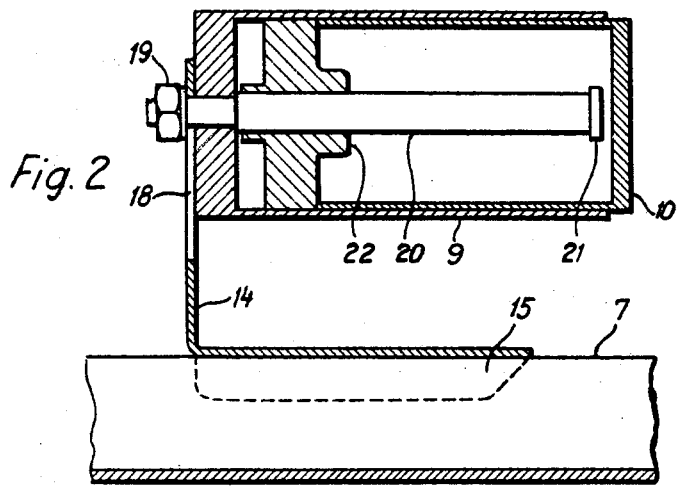
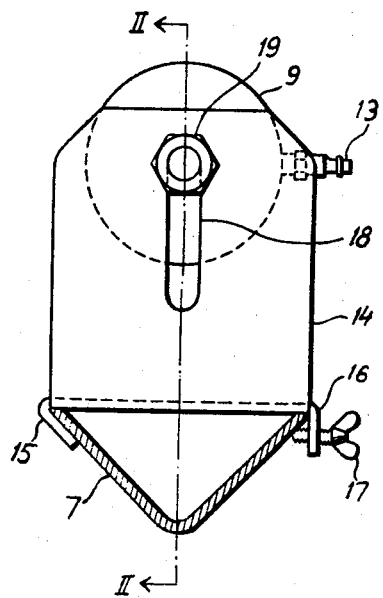
INVENTOR.
Claes Berlil Sjöholm
BY Davis, Hoxie, Faithfull & Hapgood
Attorneys

United States Patent Office 3,119,325
Patented Jan. 28, 1964

3,119,325
CHEESE PRESS
Claes Bertil Sjöholm, Malmo, Sweden, assignor to Aktiebolaget Separator, Stockholm, Sweden, a corporation of Sweden
Filed Nov. 17, 1960, Ser. No. 69,979
Claims priority, application Sweden Nov. 20, 1959
7 Claims. (Cl. 100—199)

This invention relates to cheese presses of the type adapted for simultaneously pressing two or more rows of cheese molds in the longitudinal direction of the rows, and in which the pressure on the various rows is produced by piston means driven pneumatically or hydraulically.

In the production of cheese, it is common practice to provide two or more parallel rows of cylindrical cheese molds of equal size, filled with cheese mass, and press these rows simultaneously by means of a single cylinder and piston from which the pressure is transmitted to the rows through a common press plate. However, it has been difficult to obtain the same consistency of the finished cheese in the various rows. This has been due to the difficulty of filling the molds in the different rows to the same degree and thus making the rows equal in length so that the surfaces of the molds are exposed to the same specific pressure. The finished cheese has therefore been of non-uniform quality. Further, in some instances the number of cheese molds may be different in the different rows due to the cheese batch being insufficien to fill the different rows with the same number of cheese molds.

Heretofore, it was attempted to equalize the lengths of the rows by placing filler or spacer blocks in the shorter rows, these blocks in some cases being provided with resilient end surfaces. In this way, the difference in the final compression of the various rows was reduced but not eliminated.

The principal object of the present invention is to provide a cheese press which overcomes the above-noted difficulty.

According to the present invention, the press includes an extra cylinder and piston interposed between a row of cheese molds and the common pressure-transmitting plate operated by the first piston. Although the extra cylinder may be supplied with a pressure fluid from a separate source, it is preferable to supply them from the same source as the other cylinder or cylinders. This makes it simpler to insure that the cheese mold surfaces in the various rows are exposed to the same pressure. The extra piston and cylinder can be used as a filler when a single short row of cheese molds is to be pressed; but they can be used to particular advantage when pressing two or more rows of cheese molds by means of one and the same press piston. In that case, it is not necessary to use an extra cylinder for each row of cheese molds but the press piston may act directly upon one row and, via the extra cylinder, upon each of the other rows. In this case, the press piston may act upon a plate which in turn transmits the pressing force to all the rows.

In order to make the pressing of the cheeses as uniform as possible, the extra cylinder should be arranged so that it can be centered in relation to the center line of the corresponding cheese mold row.

In the preferred construction, the extra cylinder is slidable in the longitudinal direction of the corresponding row of cheese molds in order that the available stroke length of the piston shall be adjustable to accommodate variations in length of the row of cheese molds. This may be obtained by arranging the extra cylinder so as to be supported by a frame which is slidable on a rail.

To obtain the desired centering, the cylinder may be made vertically adjustable in the frame.

According to a suitable embodiment, the extra cylinder is open at its end which faces the cheese mold row, and the cylinder piston has the form of a cylinder, the piston being slidable out through this end. A rod extending axially through the extra cylinder may then be used as an auxiliary guide for the piston. To limit the motion of the piston, a stop may be provided on that end of the rod which faces the cheese mold row.

The invention is described more in detail below, reference being made to the accompanying drawings in which FIG. 1 is a plan view of a preferred embodiment of the cheese press;

FIG. 2 is a longitudinal sectional view on line II—II of FIG. 3 of the extra cylinder, FIGS. 2 and 3 being drawn to an enlarged scale; and FIG. 3 is an end view of the extra cylinder shown in FIG. 2.

In FIG. 1, the two end parts (seen from above) of the cheese press frame are designated by 1 and 2. The cheese press comprises at least one press cylinder 3 which acts through a press plate 4 upon one, two or usually at most three rows of cheese molds, two of which are shown at 5 and 6 in FIG. 1. The various cheese molds rest on the upwardly directed edges of elongated angle irons 7 which, by means of nuts 8, are clamped between the end parts 1 and 2.

As shown in FIG. 1, two angle irons 7 are provided to support the corresponding two rows 5 and 6 of cheese molds of equal size. If three rows of such molds are to be pressed by one and the same cylinder, the center lines of the three cheese mold rows should pass through the corners of an equilateral triangle and the pressing force should be directed toward the center of this triangle. In other words, the pressing force should be applied in such a way that the specific pressure upon the end surfaces of the cheese molds will be equal in the different rows of cheese molds.

In the embodiment shown in FIG. 1, half the pressing force produced by the cylinder 3 is transmitted by plate 4 directly to the cheese mold row 5 and the other half of the pressing force is transmitted to the cheese mold row 6 by plate 4 through an extra cylinder 9, its piston 10 and a plate 11. A compressed air line 12 is connected to cylinder 3 to supply it with a pressure fluid for actuating its piston to the right as viewed in FIG. 1, the fluid supply being controlled by a suitable valve (not shown). From line 12, the same compressed air is supplied also to the cylinder 9 through a line 13. This means that the piston surfaces in the cylinders 3 and 9 are under the influence of an equally strong air pressure. For this reason, the piston surface in the cylinder 9 should be half the area of the piston surface in the cylinder 3, so that the pressing force produced by the latter cylinder is equally distributed to the two cheese mold rows 5 and 6.

In order that the specific pressure may be equal over the entire end surface of each cheese mold, the center of the end surface of the piston 10 should be aligned with the center of the adjacent end surface of the cheese mold row 6. Centering means are necessary for this purpose. As the extra cylinder 9 should be usable for cheese molds of different diameter, the extra cylinder may be made vertically adjustable in the manner shown in FIGS. 2 and 3. As there shown, the cylinder 9 is supported by mounting means in the form of a frame 14 which is slidable on the corresponding rail 7, in its longitudinal direction, by means of guide flanges 15 and 16. The frame 14 is retained on the rail 7 by means of a screw 17 which grips below one edge of the rail. To secure cylinder 9 to frame 14 for vertical adjustment on the frame, the latter has a vertical slot 18 and is clamped against the closed end of cylinder 9 by a nut 19 screwed on the end of a rod 20 which extends through this closed end of cylinder 9 and through vertical slot 18. Thus, the nut 19 forms a releasable means for securing cylinder 9 in an adjusted position transversely of mold row 6 for centering as noted above. The hollow cylindrical piston 10 is guided not only by the inside of the cylinder 9 but also by an auxiliary guide formed by rod 20, which extends axially through the interior of the cylinder 9 and concentrically with it. A stop 21 at the right-hand end of the rod coacts with a stop 22 on the piston 10 to limit the motion of this piston to the right so that the piston cannot be entirely blown out of the cylinder under the influence of the air pressure.

In the operation of the press as illustrated, the cylindrical cheese molds are placed on the rails 7, which serve as means for supporting the molds end-to-end in the respective rows 5 and 6. The frame 14 is adjusted lengthwise of the corresponding rail 7 to allow the molds of row 6 and the plate 11 to be inserted between piston 10 and the end part 2 of the main frame. An adaptor plate 24 is inserted between the closed end of cylinder 9 and the press plate 4, this adaptor plate being recessed to receive the nut 19 and the projecting end of rod 20, so that press plate 4 can exert pressure through adaptor 24 against the adjacent flat end of cylinder 9. As compressed air is admitted through supply line 12, the press plate 4 by engagement with adaptor 24 slides frame 14 and cylinder 9 to the right in FIG. 1, along the corresponding rail 7, until press plate 4 engages the adjacent end of the longer row 5, at which time piston 10 will be held against plate 11 by the air pressure in cylinder 9. As press plate 4 continues to move to the right, it compresses the mold row 5 and simultaneously moves cylinder 9 further to the right (such movement being accommodated by sliding of frame 14 on its rail 7), thereby compressing the shorter mold row 6. Due to the cylinders 3 and 9 containing the same air pressure, and the relative dimensioning of their respective pistons as previously described, the cheese molds in row 6 will be pressed to the same extent as those in the longer row 5.

I claim:

1. A cheese press comprising means for supporting two rows of cheese molds, one of which rows is shorter than the other, a power device including a first cylinder and a piston therein operable by a pressure fluid for pressing the longer of said rows endwise, a second cylinder and a piston therein operable by a pressure fluid, and means mounting said second cylinder and piston in position to transmit pressure from said power device to the shorter of said rows for pressing said shorter row endwise, said mounting means comprising a press plate interposed between said power device and both of said rows and through which said power device acts directly on the longer of said rows, said second cylinder and piston being interposed by said mounting means between the press plate and the opposing end of said shorter row wherein said power means acts through said second cylinder and piston on said shorter row and a pressure fluid line is connected to both of said cylinders, whereby the cylinders are adapted to be supplied with operating fluid at the same pressure.

2. A cheese press according to claim 1, in which said mounting means include means mounting said second cylinder for adjustment transversely of said shorter row, whereby the second cylinder can be aligned with the center line of said shorter row.

3. A cheese press according to claim 1, in which said mounting means for the second cylinder is slidable longitudinally relative to said shorter row.

4. A cheese press according to claim 1, in which said mounting means include a frame mounted on said supporting means for sliding movements longitudinally relative to said shorter row, the second cylinder being mounted on said frame.

5. A cheese press according to claim 1, in which said second cylinder is open at its end facing said shorter row, said piston being in the form of a cylinder and slidable through said open end.

6. A cheese press according to claim 1, comprising also a rod extending through said second cylinder axially thereof and forming an auxiliary guide for said piston.

7. A cheese press according to claim 1, comprising also a rod extending through said second cylinder axially thereof and forming an auxiliary guide for said piston, and a stop on the end of said rod opposite said shorter row and engageable by said piston to limit movement of the piston relative to the second cylinder toward said shorter row.

References Cited in the file of this patent

UNITED STATES PATENTS

| | | |
|---|---|---|
| 1,054,772 | Holden | Mar. 4, 1913 |
| 2,347,793 | Petersen | May 2, 1944 |
| 2,362,089 | Peters | Nov. 7, 1944 |
| 2,439,725 | Frost | Apr. 13, 1948 |
| 2,553,035 | Burrell et al. | May 15, 1951 |
| 2,642,797 | Peters | June 23, 1953 |

FOREIGN PATENTS

| | | |
|---|---|---|
| 96,945 | Sweden | Sept. 26, 1939 |
| 605,496 | Great Britain | July 26, 1948 |
| 1,048,064 | Germany | Dec. 31, 1958 |